United States Patent
Alleyne et al.

(10) Patent No.: US 8,767,540 B2
(45) Date of Patent: Jul. 1, 2014

(54) HIERARCHICAL PACKET POLICER

(75) Inventors: Brian Alleyne, Los Gatos, CA (US);
Sun Den Chen, San Jose, CA (US);
Ramanathan Lakshmikanthan, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 295 days.

(21) Appl. No.: 13/239,214

(22) Filed: Sep. 21, 2011

(65) Prior Publication Data

US 2012/0170452 A1  Jul. 5, 2012

Related U.S. Application Data

(63) Continuation-in-part of application No. 12/983,111, filed on Dec. 31, 2010, now Pat. No. 8,537,671.

(60) Provisional application No. 61/505,423, filed on Jul. 7, 2011.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ........... 370/230; 370/232; 370/254; 370/386; 370/231; 370/234; 370/236; 370/239; 370/220; 370/235; 709/239; 709/220; 709/221; 709/222; 709/225

(58) Field of Classification Search
None
See application file for complete search history.

(56) References Cited

U.S. PATENT DOCUMENTS

| 7,042,848 B2 | 5/2006 | Santiago et al. |
| 7,664,022 B2 * | 2/2010 | Hu ................................ 370/230 |
| 7,664,028 B1 | 2/2010 | Gingras et al. |
| 7,668,087 B2 * | 2/2010 | Hussain et al. ............... 370/230 |
| 2002/0186661 A1 | 12/2002 | Santiago et al. |

OTHER PUBLICATIONS

Non-Final Office Action, U.S. Appl. No. 12/983,111, dated Dec. 20, 2012, 37 pages.
Notice of Allowance, U.S. Appl. No. 12/983,111, dated May 14, 2013, 11 pages.

(Continued)

*Primary Examiner* — Ian N Moore
*Assistant Examiner* — Eric H Wang
(74) *Attorney, Agent, or Firm* — Blakely Sokoloff Taylor & Zafman LLP

(57) ABSTRACT

Embodiments of the invention a method for policing a packet at line rate. A hierarchical policer receives a policer request comprising packet characteristics and identifying request configuration information. The hierarchical policer retrieves meter states specified by the request configuration information. The hierarchical policer processes packet characteristics through meters to generate a meter result. The hierarchical policer generates a hierarchical policer table lookup address using a plurality of meter types, a plurality of input color controls, one or more of the packet characteristics, the meter results, and a plurality of coupling algorithm identifiers. The hierarchical policer reads a hierarchical meter result from a hierarchical policer result table, containing at least a final output packet attribute that classifies the packet. The hierarchical policer updates one or more of the meter states based on the plurality of meter state results. The hierarchical policer returns the final packet output to a policing requestor.

11 Claims, 11 Drawing Sheets

(56) References Cited

OTHER PUBLICATIONS

MEF Technical Specification MEF 10.1, Ethernet Services Attributes Phase 2, Nov. 2006, The Metro Ethernet Forum 2006, 65 pages.
MEF Technical Specification MEF 10.2, Ethernet Services Attributes Phase 2, Oct. 27, 2009, The Metro Ethernet Forum 2009, 65 pages.
Heinanen, J., et al., "A Single Rate Three Color Marker," rfc2697, Network Working Group, Request for Comments: 2697, Sep. 1999, pp. 1-6.
Heinanen, J., et al., "A Two Rate Three Color Marker," rfc2698, Network Working Group, Request for Comments: 2698, Sep. 1999, pp. 1-5.
Aboul-Magd, O., et al., "A Differential Service Two-Rate, Three-Color Marker with Efficient Handling of in-Profile Traffic," rfc4115, Network Working Group, Request for Comments: 4115, Jul. 2005, pp. 1-6.

* cited by examiner

HIERARCHICAL METER RESULT MODULE 235

HIERARCHICAL PACKET POLICER

CROSS-REFERENCE TO RELATED APPLICATIONS

This application is a continuation-in-part of U.S. application Ser. No. 12/983,111, filed Dec. 31, 2010, and claims the benefit of U.S. Provisional Application No. 61/505,423, filed Jul. 7, 2011, which are hereby incorporated by reference.

FIELD OF THE INVENTION

Embodiments of the invention relate generally to the field of telecommunications; and more particularly, to quality of service in packet based communication networks.

BACKGROUND

Quality of Service (QoS) is an evolving technology in today's networking infrastructure. It allows the networks to provide different levels of services for different types of network traffic. Packet policing is one of the important elements used extensively to support a QoS framework. Packet policing refers to the per packet analysis of whether each packet adheres to the QoS requirements of a network element.

Packet policing involves measuring the traffic rate against specified rates of the traffic type and taking specified actions based on the measured results. There are several industry specifications defining how policing operations can be performed. Examples of these specifications are Internet Engineering Task Force (IETF) Request for Comments (RFC) 2697, RFC 2698, and RFC 4115 and Metro Ethernet Forum (MEF) 10.2. All of these documents describe how individual policing operations may be performed. Varying communicating protocols utilize different methods and specifications for implementing packet policing. For example, internet protocol (IP) packet policing may utilize RFC 4115, "A Differentiated Service, Two-Rate, Three-Color Marker with Efficient Handling of in-Profile Traffic" (July 2005), describes "a two-rate, three-color marker" for traffic metering and marking. The RFC describes a packet marker that classifies a packet into RED, YELLOW, or GREEN categories according to the size of the packet and the current state of token buckets used in a packet meter. For instance, one token bucket may track the committed information rate while another token bucket may track the excess information rate. The network element may then react to the classification by dropping all RED packets, transmitting YELLOW packets according to a best effort, and transmitting GREEN packets with a low probability of drop.

As the network infrastructure evolves over time, the complexity of policing operation also increases. One example is to allow one or multiple policing operations be performed on a single packet. When multiple policing operations are performed on a packet, the action taken on the packet may vary depending on configuration of the network, customer desires, or technological requirements.

One prior art solution is to configure the packet policing operation entirely in software to provide flexibility in the configuration of the policing operations. However, as the data rate of a network increases the performance of a pure software solution cannot keep up with the increasing data rate. Another prior art solution is to implement specific packet policing configurations in hardwired logic. In this solution, the hardware is fast enough to keep up with the increasing data rates, but the hardware does not have the flexibility to adapt to varied configurations and changing requirements.

SUMMARY

Embodiments of the invention include a method performed in a packet processor core for policing a packet through a runtime configurable hierarchical policer, which is coupled to one or more policing requestors, at line rate. The hierarchical policer receives, from one of the policing requestors, a policer request to perform hierarchical packet policing, wherein the policer request comprises packet characteristics and identifies request configuration information. The hierarchical policer retrieves a plurality meter states from meter state storage, each meter state specified by the request configuration information for one of the plurality of meters. The hierarchical policer processes one or more of the packet characteristics through each meter to generate a meter result indicating how one or more of the packet characteristics compare to that meter's specified meter state. The hierarchical policer generates a hierarchical policer table lookup address using a plurality of meter types, a plurality of input color controls, one or more of the packet characteristics, the plurality of meter results, and the plurality of coupling algorithm identifiers. The hierarchical policer reads a hierarchical meter result from a hierarchical policer result table, wherein the hierarchical meter result contains at least a final output packet attribute that classifies the packet. The hierarchical policer updates one or more of the meter states based, in part, on the plurality of meter state results. Finally, The hierarchical policer returns the final packet output to the policing requestor.

Embodiments of the invention include a hierarchical policer module, coupled to one or more policing requestors, to police a packet through a runtime configurable hierarchical policer at line rate. The hierarchical policer module comprising a policer control module and a hierarchical meter result module. The policer control module configured to receive policer requests that originate from policing requestors. Each policer request includes packet characteristics and includes request configuration information. The request configuration information identifies a meter state, an information rate, a burst size, a meter type, an input color control, and a coupling algorithm identifier for each of a plurality of meters. The policer control module configured to retrieve the plurality of specified meter states from meter storage, each meter state comprised of meter tokens that each indicates an amount of available resources for that meter state. The policer control module configured to transmit one or more of the packet characteristics, the plurality of identified meter states, the plurality of information rates, the plurality of burst sizes, the plurality of identified meter types, the plurality of identified input color controls, and the plurality of coupling algorithm identifiers to the hierarchical meter result module. The policer control module configured to receive a hierarchical meter result from the hierarchical meter result module, the hierarchical meter result including a final output packet attribute to classify the packet. The policer control module further configured to transmit a policer response to the policing requestor, the policer response indicating, at least, the final packet output attribute. The hierarchical meter result module, coupled to the policer control module, configured to generate a meter result at one or more meters to indicate how one or more of the packet characteristics compares with that meter's identified meter state. The hierarchical meter result module further configured to generate a hierarchical policer table lookup address with a plurality of meter types, a plurality of input color controls, one or more of the packet characteristics, the plurality of meter results, and the plurality of coupling algorithm identifiers. The hierarchical meter result module configured to read the hierarchical meter result from a hierarchical policer result table. The hierarchical meter result module configured to transmit the hierarchical meter result to the policer control module.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings.

DETAILED DESCRIPTION

The following description describes methods and apparatus for hierarchical packet policing implemented in hardware but flexibly configured by packet policing requests. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention are directed to a system and method for packet policing packets through multiple levels of meters in a network element. The system provides a mechanism for implementing a series of meters in hardware but allowing for the configuration of how the levels interact and combine with one another to occur in software; the configuration is provided by each request to perform packet policing. Thus the system has the performance benefit of implementing hierarchical packet policing in hardware but has the flexibility benefit of configuring the packet policing in software.

Figure 1:
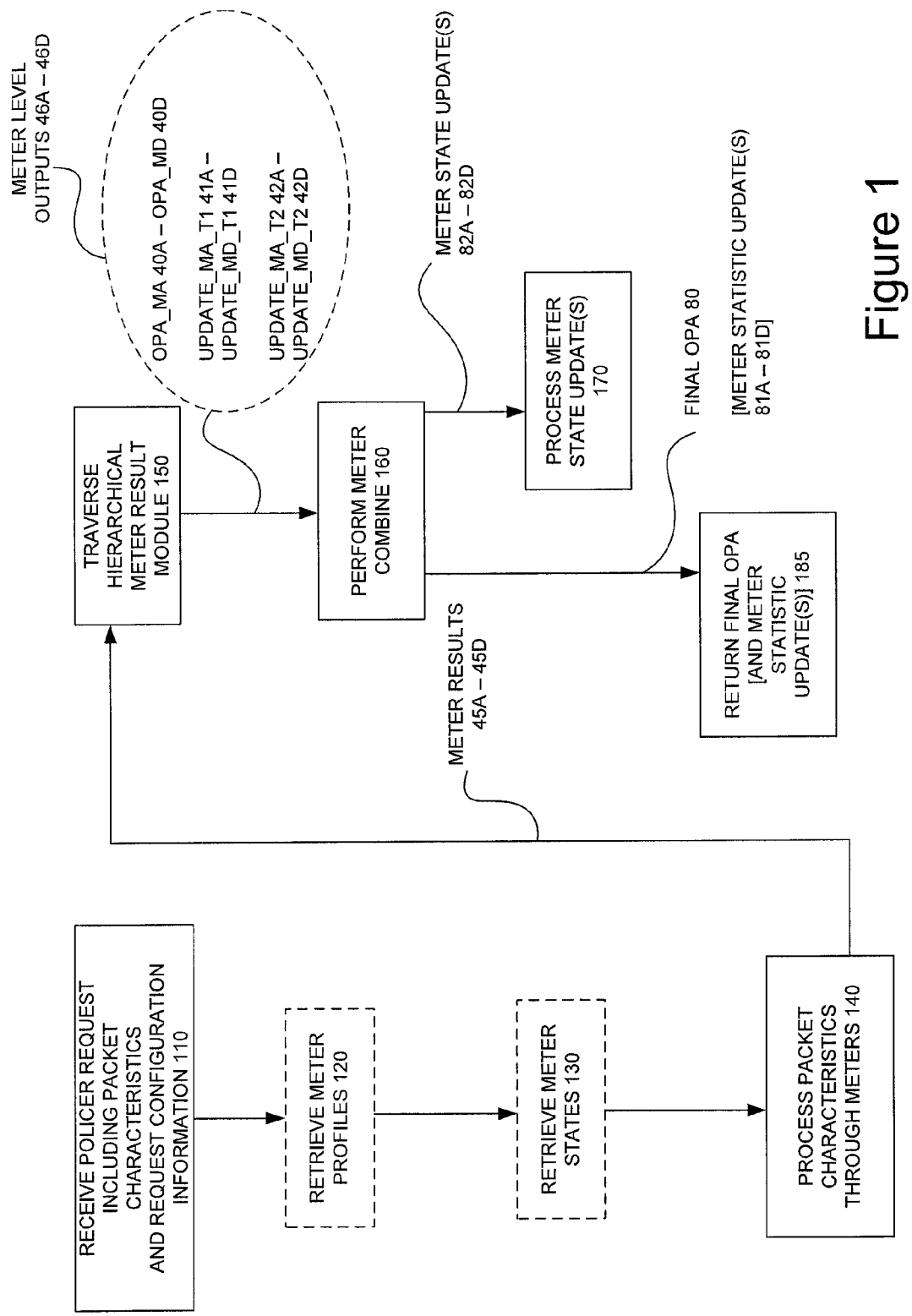
FIG. 1 is a flow chart illustrating a method for performing hierarchical packet policing according to embodiments of the invention.

FIG. 1 illustrates a flow chart of a method for performing hierarchical packet policing according to embodiments of the invention. This figure includes steps that are optional depending on the specific implementation and such steps are shown with dashed boxes. A policer request is received (Block 110) including packet characteristics 308 and request configuration information. In one embodiment, a plurality of meter profiles 30A-30D, identified by the request configuration information, are retrieved (Block 120) from a meter profile table 230. In a further embodiment, a plurality of meter states 295A-295D are retrieved (Block 130) from either a meter state memory 290 or meter state cache 225. The optional steps (Block 120 and Block 130) may be utilized together in embodiments of the invention.

The packet characteristics 308 are then processed (Block 140) through meters 320A-320D, each meter corresponding to a meter level A-D, to produce meter results 45A-45D. Although four meter results 45A-45D are indicated by FIG. 1, it should be understood that the number of meter results 45 corresponds to the number of meter levels used in a hierarchical meter result module 235. As evident in discussion of embodiments of the invention, the properties of each meter level A-D are defined by the corresponding meter profiles 30A-30D and coincide with a plurality of meter states 295A-295D designated for that particular level. Furthermore, though the figures show four levels in an exemplary fashion the invention is not limited to embodiments with four levels.

Figure 4:
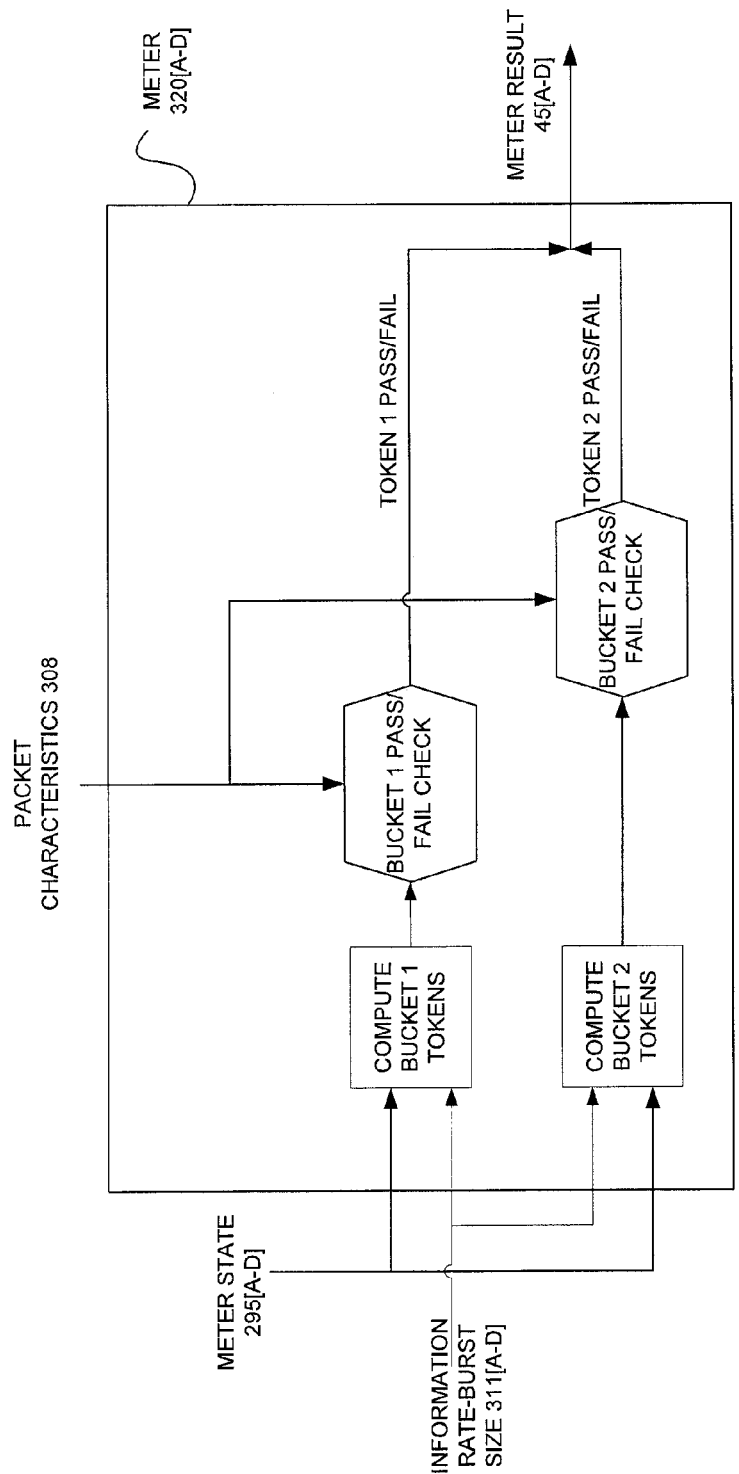
FIG. 4 is a block diagram illustrating a packet meter used by one of the plurality of meter levels according to embodiments of the invention.

In one embodiment, the meters 320A-320D operate as illustrated by FIG. 4. FIG. 4 is a block diagram illustrating a packet meter 320 used by one of the plurality of meter levels according to embodiments of the invention (e.g. the packet meters 320A-320D). The meter 320 receives a corresponding meter state 295, from either the meter state cache 225 or meter state memory 290, the packet characteristics 308, and the information rate-burst size combination 311. In one embodiment, the packet characteristics 308 include a packet size corresponding to the packet being policed. It is desirable to allow a variety of metering algorithms, therefore embodiments allow for the meter states 295A-295N to track different pieces of measurement information for each meter state. In one embodiment, one of the meter states 295A-295N includes tokens to track a committed information rate (CIR) and an excess information rate (EIR). In another embodiment, one of the meter states 295A-295N includes tokens to track packet information rate (PIR). In one embodiment, meter state 295A includes tokens for the CIR and the EIR, meter state 295B includes tokens for the CIR, and meter state 295C includes tokens for the PIR and CIR. It should be noted that tokens for the different pieces of measurement information may be mixed and matched into different of combinations in the meter states according to the design needs of the network element. In other embodiments, timestamps may be used in lieu of tokens to track CIR, EIR, or PIR. Further, in one embodiment the meter state 295A and the meter 320A includes more than two tokens and more than two meter tests respectively.

In FIG. 4, meter 320A checks the packet size against the tokens contained within the received meter state 295A (also referred to as token buckets). The meter 320A generates a meter result 45A that indicates the result of each check against each token bucket. Meter 320A receives information rate-burst size combination 311A that includes a given information rate and burst size for the first token bucket and second information rate and burst size for the second token bucket. Meter 320A uses the meter state 295A and information rate-burst size combinations 311A to compute the bucket 1 tokens and the bucket 2 tokens and then performs a bucket 1 and bucket 2 check. The bucket tokens are compared against token check value. For example, the token check value may be set to 0 or may be set to the packet size. As such, in one embodiment, the meter result 45A indicates whether the subtraction of the packet size from each token bucket is greater than zero. If the result of the subtraction is greater than zero then the result for the check against that token bucket is a pass otherwise the result for that token bucket is a fail. The result of each check against the token buckets is aggregated into meter result 45A. In another embodiment, the meter 320A checks whether each token bucket is greater than zero, indicating a pass, and aggregates the result into meter result 45A. Meter results 45B-45D are generated by meters 320B-320D in the same manner as meter 320A. In another embodiment, meter 320A checks the packet size against two tokens and generates a two bit meter result 45A, each bit representing the result of the comparison against one of the two tokens. While in another embodiment, the meter 320A checks the packet size again N tokens and generates an N bit meter result 45A.

Referring back to FIG. 1, the meter results 45A-45D are used to traverse (Block 150) the hierarchical meter result module 235 and produce a plurality of meter level outputs 46A-46D. The meter level outputs 46A-46D include a set of one or more meter level output packet attributes 40A-40D and a plurality of sets of one or more meter token state update indicators 41A-41D and 42A-42D. The meter level outputs 46A-46D are used to perform a meter combine (Block 160) that generates a set of one or more meter state updates 82A-82D and a final output packet attribute 80. In one embodiment, the meter combine step (Block 160) further generates a set of meter statistic updates 81A-81D (shown as optional by brackets in FIG. 1). The meter state updates 82A-82D are processed (Block 170) to update one or more meter states. The final output packet attribute 80, and optionally the meter statistic updates 81A-81D, is returned (Block 185) to a policer requestor 201.

Figure 2:
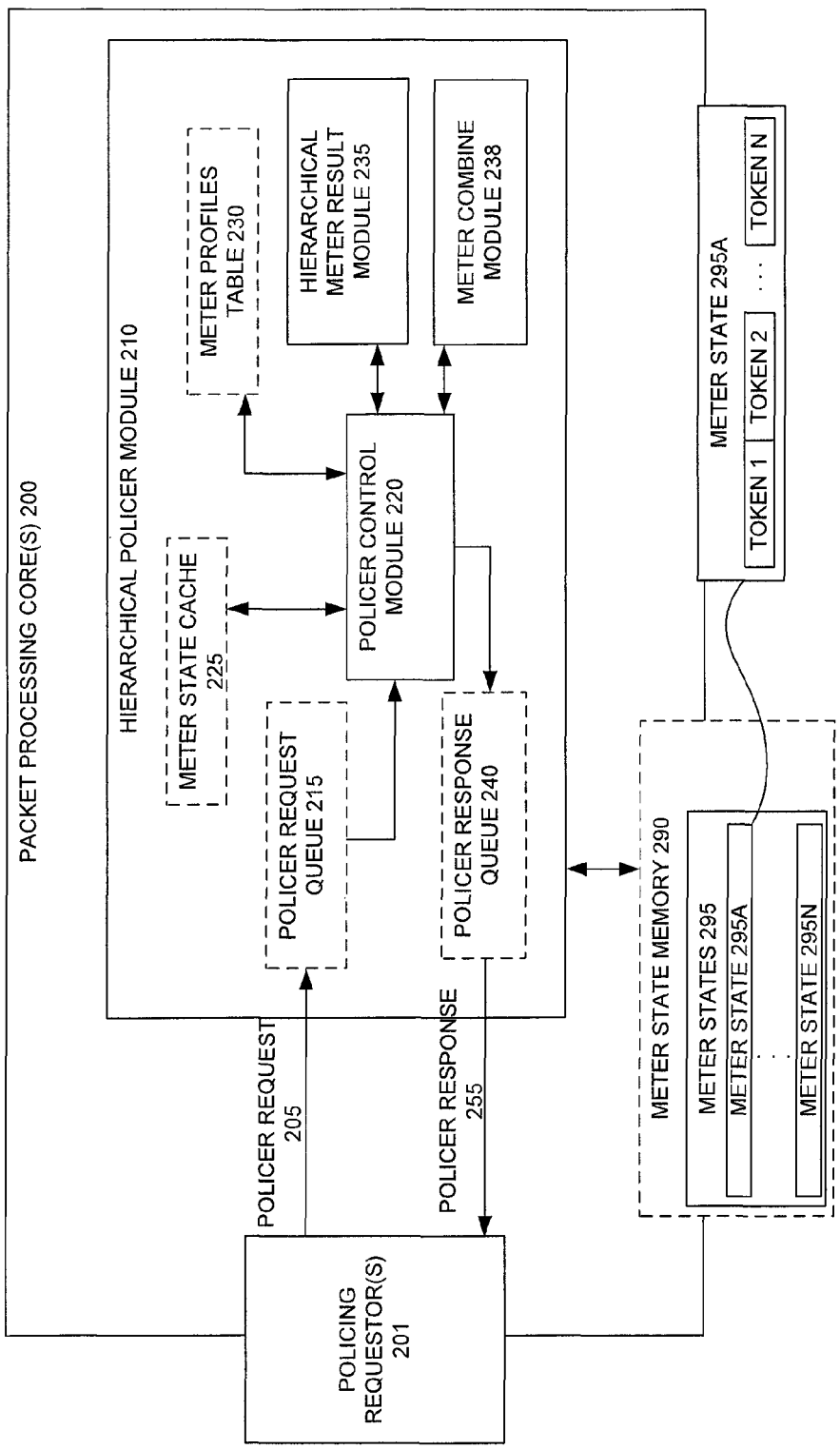
FIG. 2 is a block diagram illustrating a system including at least one policing requestor and at least one packet processing core that includes a hierarchical policer module in which packets are processed through a hierarchy of meter levels according to embodiments of the invention.

FIG. 2 is a block diagram illustrating a system including at least one policing requestor and at least one packet processing core that includes a hierarchical policer module in which packets are processed through a hierarchy of meter levels according to embodiments of the invention. In FIG. 2, some modules are optional and are shown with dashed boxes as such. FIG. 2 illustrates a set of packet processing cores 200 coupled to one or more policing requestors 201; in one embodiment a plurality of packet processing cores 200 are coupled together and further coupled to the plurality of policing requestors 201. In another embodiment, the policing requestors 201 are a module included within the packet processor cores 200.

In FIG. 2, the packet processor cores 200 include a hierarchical policer module 210 that is coupled to the policing requestors 201. In FIG. 2, the hierarchical policer module 210 is configured to communicate with the policer requestors 201 to receive policer requests 205 and transmit policer responses 255. As described above, the policer requests 205 includes packet characteristics 308 and request configuration information. In one embodiment, the policer response 255 includes a final output packet attribute 80 typically marking a packet GREEN, YELLOW, or RED. While in another embodiment, the policer response 255 includes a final output packet attribute 80 and a set of one or more meter statistic updates 81A-81D that indicate updates to one or more sets of statistics associated with the requested meter levels. For example, the request configuration information may configure four meter levels that are processed to generate the policer response 255. The policer response 255 would then include meter statistic updates 81A-81D that indicate how statistics for each of the identified meter levels should be updated; e.g. for each level whether GREEN, YELLOW, or RED statistics should be incremented. The statistics track the number of packets falling into each category.

The hierarchical policer module 210 is further coupled to meter state memory 290. The meter state memory 290 may be included as part of the packet processor cores 200 or may be external to the packet processing cores 200. The meter state memory 290 stores a plurality of meter states 295. In one embodiment, the hierarchical policer module 210 further includes a meter state cache 225 shown in dashed lines. In this embodiment, the policer control module 220 checks for the presence of a meter state 295A, identified by the policer request 205, in the meter state cache 225. If the identified meter state 295A is not in the meter state cache 225, then the policer control module 220 retrieves the meter state 295A from among a plurality of meters states 295A-295N in the meter state memory 290 and stores the meter state 295A in the meter state cache 225. Additional processing of the meter state 295A is performed with the cached copy of meter state 295A to ensure all processing requiring access to meter state 295A will have low latency access to meter state 295A and the most recent copy of meter state 295A is available. This has the advantage of allowing rapid access and update of meter state 295A by a plurality of metering requests, such as processing multiple metering requests at line rate utilizing meter state 295A.

The hierarchical policer module 210 includes a policer control module 220 that is coupled to the hierarchical meter result module 235 and a meter combine module 238. In one embodiment the policer control module 220 receives the meter level outputs 46A-46D from the hierarchical meter result module 235. In turn, the policer control module 220 communicates the meter level outputs 46A-46D to the meter combine module 238. In another embodiment, the hierarchical meter result module 235 communicates the meter level outputs 46A-46D to the meter combine module 238.

In one embodiment, the hierarchical policer module 210 further includes a policer request queue 215 and a policer response queue 240, each coupled to the policer control module 220 and shown in dashed lines. The policer request queue 215 is configured to receive policer request 205 and the policer response queue 240 is configured to hold policer responses 255 until they are communicated to the corresponding policing requestor 201. In at least one embodiment, the hierarchical policer module 210 is one module in a chain of modules performing packet processing in the packet processing cores 200. In this embodiment the hierarchical policer module 210 receives policer requests 205 that instruct the hierarchical policer module 210 to perform policing and pass the result onto the next module in the chain.

In one embodiment, the hierarchical policer module 210 further includes a meter profiles table 230. The meter profiles table 230 stores a plurality of sets of configuration information (i.e. meter profile) to be used by each meter level in the hierarchical meter result module 235. In this embodiment, the policer request 205 includes information that identifies one or more meter profiles 30A-30D to be used for that policer request. The policer control module 220 retrieves the requested meter profiles 30A-30D from the meter profiles table 230. The meter profiles 30A-30D can then be used to configure the hierarchical meter result module 235. In one embodiment, the meter profiles are identified in the meter profiles table 230 by an algorithm identifier while in other embodiments a numerical index is used to identify the desired meter profile. Furthermore, in one embodiment the meter profiles 30A-30D include information specifying a meter type 302, a meter input packet attribute select 304, and a color mode select 305. Still in further embodiments, the meter profiles 30A-30D include rate specifications such as CIR, EIR, and PIR as well as bust sizes such as committed burst size (CBS), excess burst size (EBS), and peak burst size (PBS). While in other embodiments, the meter profiles 30A-30D include more or less information such as identifying a meter state 295A to be used by the meter level using that meter profile. The usage of the meter profiles by the meter levels is described below.

Figure 3A:
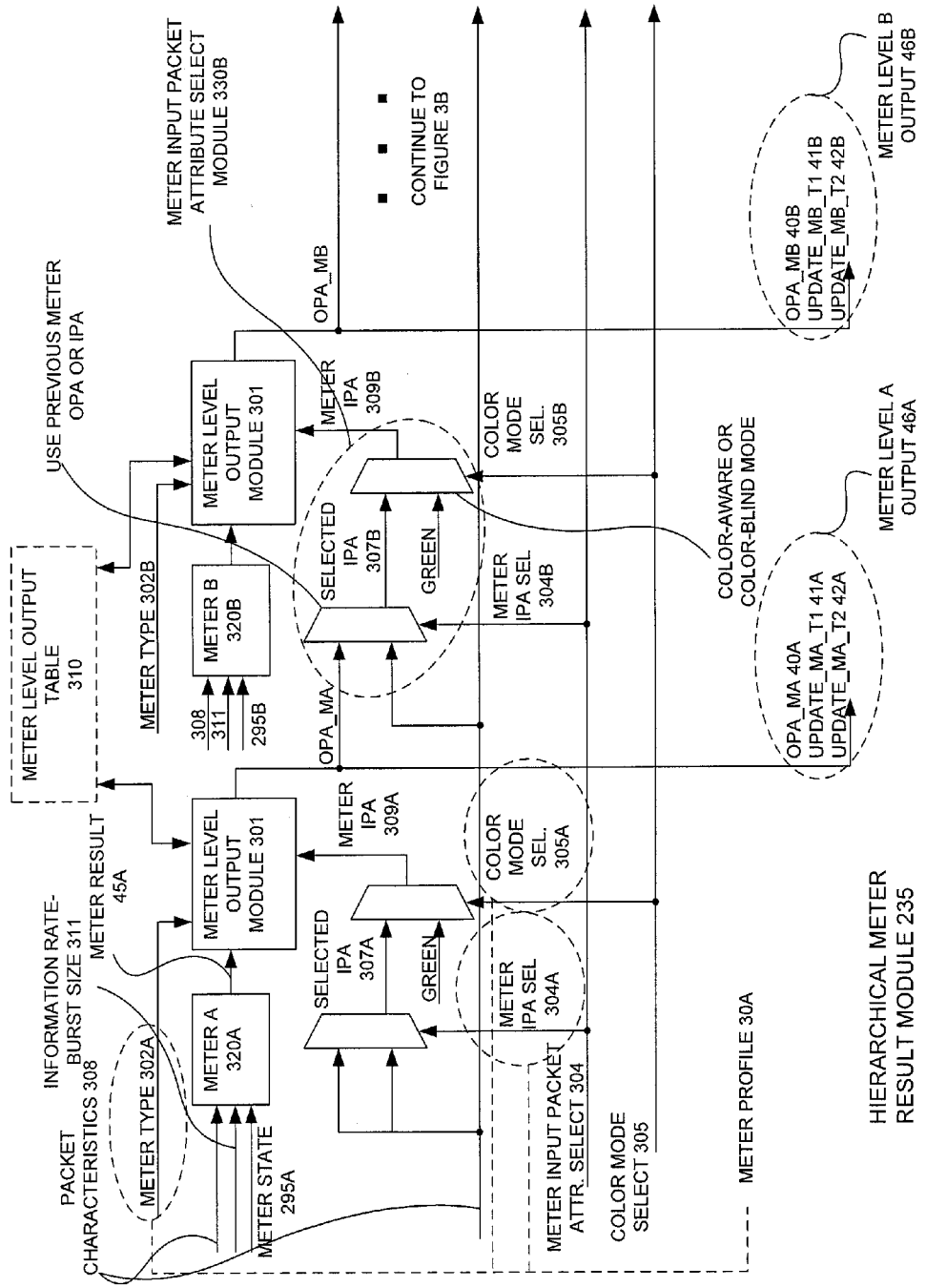
FIGS. 3A and 3B are block diagrams illustrating a plurality of levels of a hierarchical meter result module to be configured into a hierarchy of meter levels according to a packet policing request according to embodiments of the invention.
Figure 3B:
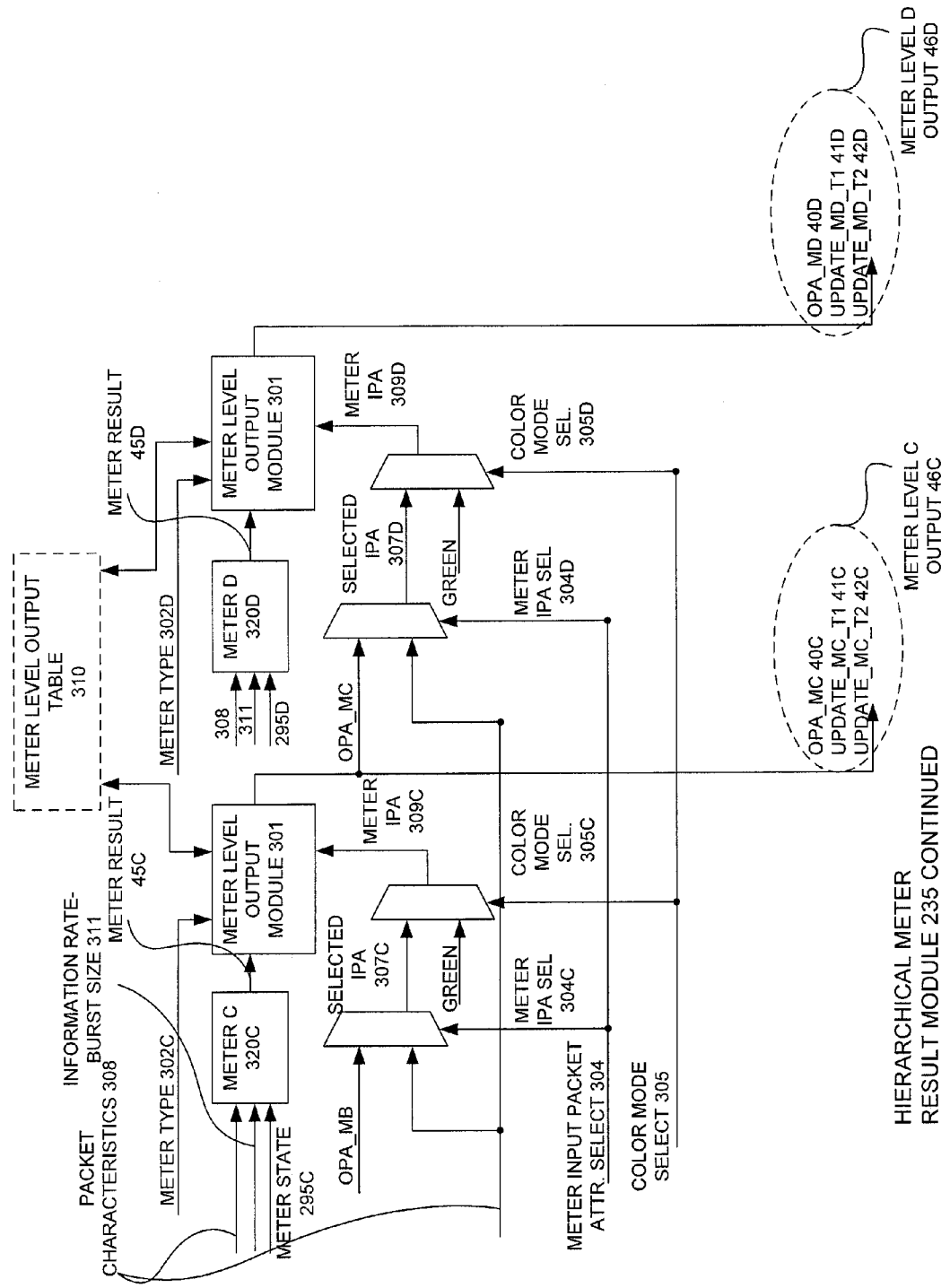

FIGS. 3A and 3B are block diagrams illustrating a plurality of levels of a hierarchical meter result module to be configured into a hierarchy of meter levels according to a packet policing request according to embodiments of the invention. The figures combine such that 3A and 3B illustrate a four level embodiment of hierarchical meter result module. Some modules are optional and are shown with dashed boxes as such. Furthermore, FIGS. 3A and 3B use dashed ovals to logically group sets of inputs, outputs, and modules.

In FIGS. 3A and 3B, the hierarchical meter result module (HMRM) 235 has a plurality of meter levels including an initial level and one or more subsequent levels. Each meter level includes a meter 320A-320D, a meter IPA select module 330A-330D, and makes use of a meter level output module 301. The operation of the HMRM 235 performs the traversing step of FIG. 1 (Block 150) and generates the set of meter level outputs 46A-46D.

The HMRM 235 receives a plurality of meter profiles 30A-30D to configure the plurality of meter levels. Each meter profile 30A-30D is comprised of a meter type 302A-302D, a meter input packet attribute (IPA) select 304A-304D, and a color mode select 305A-305D. In FIG. 3, meter profile 30A is illustrated as three dashed ovals grouping together meter type 302A, meter IPA select 304A, and color mode select 305A; meter profiles 30B-30D are not illustrated to avoid unnecessary confusion in the figure. Furthermore, the HMRM 235 receives a plurality of meter states 295A-295D and packet characteristics 308.

The HMRM feeds each meter state 295A-295D into a corresponding meter 320A-320D along with packet characteristics 308 and the information rate-burst size combination 311A-311D for that meter. Each meter 320A-320D operates as described above with reference to FIG. 4 to generate meter results 45A-45D. In at least one embodiment, the meters at the subsequent levels B-D receive the packet characteristics 308 from the previous meter along with a packet size adjustment that increases or decreases the packet size used in the meter for that level. In this way meter 320B receives the packet size from meter 320A along with an adjustment, meter 320C receives the packet size from meter 320B along with an adjustment, and meter 320D receives the packet size from meter 320C along with an adjustment.

The HMRM uses meter IPA select modules 330A-330D to generate meter IPAs 307A-307D. The meter IPA select modules 330A-330D (330B is illustrated in FIG. 3A as a dashed oval surrounding two multiplexers) uses the meter IPA selects 304A-304D and color mode selects 305A-305D along with the packet characteristics 308 to generate meter IPAs 307A-307D. With reference to the initial level A, the meter IPA select 304A is feed into a multiplexer to generate a selected IPA 307A, which is chosen between two potential inputs. At the initial level A, both inputs are identical and are assigned to an IPA contained within the packet characteristics 308. The IPA contained in the packet characteristics 308 indicates a pre-color for the packet; either RED, YELLOW, or GREEN. Prior to making the policing request, modules external to the hierarchical policer module 210 may pre-color the packet according to well-known methods. For example, packets that carry voice traffic may be pre-colored green to indicate a higher priority and to bias the policer away from marking the packet RED. On the other hand, packets that carry data traffic may be pre-colored yellow to indicate no bias towards a final packet color. At subsequent meter levels B-D, the corresponding selected IPA 307B-307D is chosen between a meter level output packet attribute (OPA) 40A-40C of the previous meter level and the IPA contained within the packet characteristics 308. This choice is made based on the meter IPA select 304B-304D. In this way meter levels B-D may be configured to take into account the coloring of the OPA 40A-40C from the previous level or use the initial coloring for the IPA of the packet characteristics in generating that meter level's OPA 40B-40D.

The selected IPA 307A-307D and a GREEN IPA are feed into a second multiplexer and are chosen between based on the color mode selector 305A-305D. If the color mode select 305A-305D indicates a color-aware mode, then the selected IPA 307A-307D is chosen as the meter IPA 309A-309D. If the color mode select 305A-305D indicates a color-blind mode, then the GREEN IPA is chosen as the meter IPA 309A-309D. In this way each meter level A-D may be configured to take into account pre-color biasing or to ignore pre-color biasing by assuming the packet was pre-colored GREEN.

The HMRM 235 then feeds meter result 45A-45D, meter type 302A-302D, and meter IPA 309A-309D into the meter level output module 301. The meter type 302A-302D is a field used to indicate which algorithm the meter level output module 301 will use to generate the meter level output 46A-46D. In one embodiment, the meter type 302A-302D indicates which metering standard is being used for a meter level, e.g. single rate three-color meters (RFC 2697) and two rate three-color meters (RFC 2698, RFC 4115, or MEF 10.2). In another embodiment, the meter 302A-302D indicates a custom algorithm being used for a meter level. The meter level output module 301 uses the meter type 302A-302D, the meter IPA 309A-309D, and the meter result 46A-46D to generate a meter level output 45A-45D that includes a meter level OPA 40A-40D and meter token state update indicators 41A-41D and 42A-42D for each of the plurality of tokens. Each meter level OPA 40A-40C is feed into a subsequent level's meter IPA select module 330B-330D. The meter token state update indicators 41A-41D and 42A-42D specify which tokens should be updated according to the meter level output module 301. In one embodiment, the OPA 40A-40D indicates one of three packet colors (GREEN, YELLOW, RED) for a meter level, while in another embodiment the OPA 40A-40D utilizes an alternative coloring scheme (BLUE, PURPLE, ORANGE). Alternatively, the OPA 40A-40D can indicate a different packet classification system such as numerically (1, 2, 3, 4, 5)

By way of example, if a policer request indicates that meter level is conforming to RFC 2698 according the meter type 302A then the meter level output module 301 may set contents the meter level output 46A in the following manner. The meter state 295A corresponds with PIR tokens and CIR tokens, and information rate-burst size combinations 311A corresponds with the desired PIR, PBS, CIR, and CBS. Thus, meter 320A performs checks against a peak token bucket (PTB) and committed token bucket (CTB). If the meter IPA 309A is set to RED or if the meter result 45A bit corresponding to the check against the PTB fails, then the meter level OPA 40A is set to RED and the first meter token state update indicator 41A (PTB update) and the second meter token state update indicator 42A (CTB update) are set to false (no update indicated). If the meter IPA 309A is set to YELLOW or GREEN, and if the meter result 45A bit corresponding to the check against the PTB passes, then the meter level OPA 40A is set to YELLOW and the first meter token state update indicator 41A is set to true and the second meter token state update indicator 42A is set to false (update indicated for PTB only). If the meter IPA 309A is set to GREEN and the meter result 45A bits corresponding to the check against the PTB and the check against the CTB both pass, then the meter level OPA 40A is set to GREEN and both meter token state update indicators 41A and 42A are set to true.

Further example may be gained by describing how a meter level may operate if conforming to RFC 4115, as specified by meter type 302B. If the meter IPA 309B is set to RED, then the meter level OPA 40B is set to RED and both meter token state update indicators 41B (excess token bucket (ETB)) and 42B (CTB) are set to false (no update indicated). If the meter IPA 309B is set to YELLOW and the if the meter result 45B bit corresponding to the check against the ETB token fails, then the meter level OPA 40B is set to RED and both meter token state update indicators 41B and 42B are set to false (no update indicated). If the meter IPA 309B is set to YELLOW and the if the meter result 45B bit corresponding to the check against the ETB passes, then the meter level OPA 40B is set to YELLOW and the first meter token state update indicator 41B (corresponding to an update to the ETB) is set true while the second meter token state update indicator 42B (corresponding to an update to the CTB) is set to false. If the meter IPA 309B is set to GREEN and if the meter result 45B bit corresponding to the check against the CTB token passes, then the meter level OPA 40B is set to GREEN and the first meter token state update indicator 41B (corresponding to an update to ETB) is set false while the second meter token state update indicator 42B (corresponding to an update to CTB) is set to true. If the meter IPA 309B is set to GREEN and if the meter result 45B bit corresponding to the check against the CTB token fails while the meter result 45B bit corresponding to the check against the EBS token passes, then the meter level OPA 40B is set to YELLOW and the first meter token state update indicator 41B (corresponding to an update to ETB) is set true while the second meter token state update indicator 42B (corresponding to an update to CTB) is set to false. If the meter IPA 309B is set to GREEN and the if the meter result 45B bits corresponding to the check against the CTB and the ETB both fails, then the meter level OPA 40B is set to RED and both meter token state update indicators 41B and 42B are set to false.

In one embodiment, the operation of meter level output module 301 is a table lookup. In this embodiment, the meter level output module 301 uses the meter result 45, meter type 302, and meter IPA 309 to generate an address into a meter level output table 310. The meter level output table 310 holds an entry indicating the value of a meter level OPA 40 and meter token state update indicators 41 and 42 for given combinations of the meter result 45, meter type 302, and meter IPA 309. For example, the meter result 45 is a two bit value, each bit indicating a pass or fail of one of the token comparisons as described with reference to FIG. 4. Furthermore, the meter type 302 is a four bit value allowing for up to sixteen defined meter types; i.e. meters complying with various standards such as RFC 2697, RFC 2698, RFC 4115, and MEF10.2. The following table shows a plurality of entries in a meter level output table 310 illustrating exemplary inputs and outputs. In the following table, RFC 2698 is meter type 0000 while RFC 4115 is meter type 0001. With reference to RFC 2698, the low order bit for meter result 45 represents the result of the comparison with the CTB and the high order bit represents the result of the comparison with the PTB. While compared to RFC 4115, the low order bit for meter result 45 represents the result of the comparison with the CTB and the high order bit represents the result of the comparison with the ETB. Finally, the meter IPA 309 and meter level OPA 40 are three bit values where GREEN is 111, YELLOW is 010, and RED is 000. In such a case the combination of the three inputs creates a nine bit address where the first four high order bits are the meter type 302, the next three bits are the meter IPA 309, and the low order two bits are the meter result 45. In other embodiments, the meter type 302, meter IPA 309, and meter result 45 may be in a different order to generate an index into the meter level output table 310 and/or may be different lengths to accommodate more or less input possibilities. As well, the meter level OPA 40 and update indicators 41 and 42 may have more or less bits to accommodate other configurations of outputs.

TABLE 1

Illustrating Exemplary Entries in Meter Level Output Table 310

| Inputs | | | Outputs (METER LEVEL OUTPUT 46) | | |
|---|---|---|---|---|---|
| | | | | FIRST METER TOKEN | SECOND METER TOKEN |
| METER TYPE 302 | METER IPA 309 | METER RESULT 45 | METER LEVEL OPA 40 | STATE UPDATE INDICATOR 41 | STATE UPDATE INDICATOR 42 |
| (RFC 2698) | (RED) | (PTB)/(CTB) | (RED) | (PTB) | (CTB) |
| 0000 | 000 | 00 | 000 | 0 | 0 |
| 0000 | 000 | 01 | 000 | 0 | 0 |
| 0000 | 000 | 10 | 000 | 0 | 0 |
| 0000 | 000 | 11 | 000 | 0 | 0 |
| | (YELLOW) | (PTB)/(CTB) | (RED) | (PTB) | (CTB) |
| 0000 | 010 | 00 | 000 | 0 | 0 |
| 0000 | 010 | 01 | 000 (YELLOW) | 0 | 0 |
| 0000 | 010 | 10 | 010 | 1 | 0 |
| 0000 | 010 | 11 | 010 | 1 | 0 |
| | (GREEN) | (PTB)/(CTB) | (RED) | (PTB) | (CTB) |
| 0000 | 111 | 00 | 000 | 0 | 0 |
| 0000 | 111 | 01 | 000 (YELLOW) | 0 | 0 |
| 0000 | 111 | 10 | 010 (GREEN) | 1 | 0 |
| 0000 | 111 | 11 | 111 | 1 | 1 |
| (RFC 4115) | (RED) | (EBT)/(CTB) | (RED) | (EBT) | (CTB) |
| 0001 | 000 | 00 | 000 | 0 | 0 |
| 0001 | 000 | 01 | 000 | 0 | 0 |
| 0001 | 000 | 10 | 000 | 0 | 0 |
| 0001 | 000 | 11 | 000 | 0 | 0 |
| | (YELLOW) | (EBT)/(CTB) | (RED) | (EBT) | (CTB) |
| 0001 | 010 | 00 | 000 | 0 | 0 |
| 0001 | 010 | 01 | 000 (YELLOW) | 0 | 0 |
| 0001 | 010 | 10 | 010 | 1 | 0 |
| 0001 | 010 | 11 | 010 | 1 | 0 |
| | (GREEN) | (EBT)/(CTB) | (GREEN) | (EBT) | (CTB) |
| 0001 | 111 | 01 | 111 | 0 | 1 |
| | | 11 | 111 (YELLOW) | 0 | 1 |
| 0001 | 111 | 10 | 010 (RED) | 1 | 0 |
| 0001 | 111 | 00 | 000 | 0 | 0 |

While Table 1 shows table inputs and output corresponding to RFCs 2698 and 4115, other embodiments may contain more or less entries in the meter level output table 310. For example, entries may include custom entries corresponding to meter profiles developed by network service provides or entries may include other standardized meters such as RFC 2697 and MEF 10.2.

Figure 5:
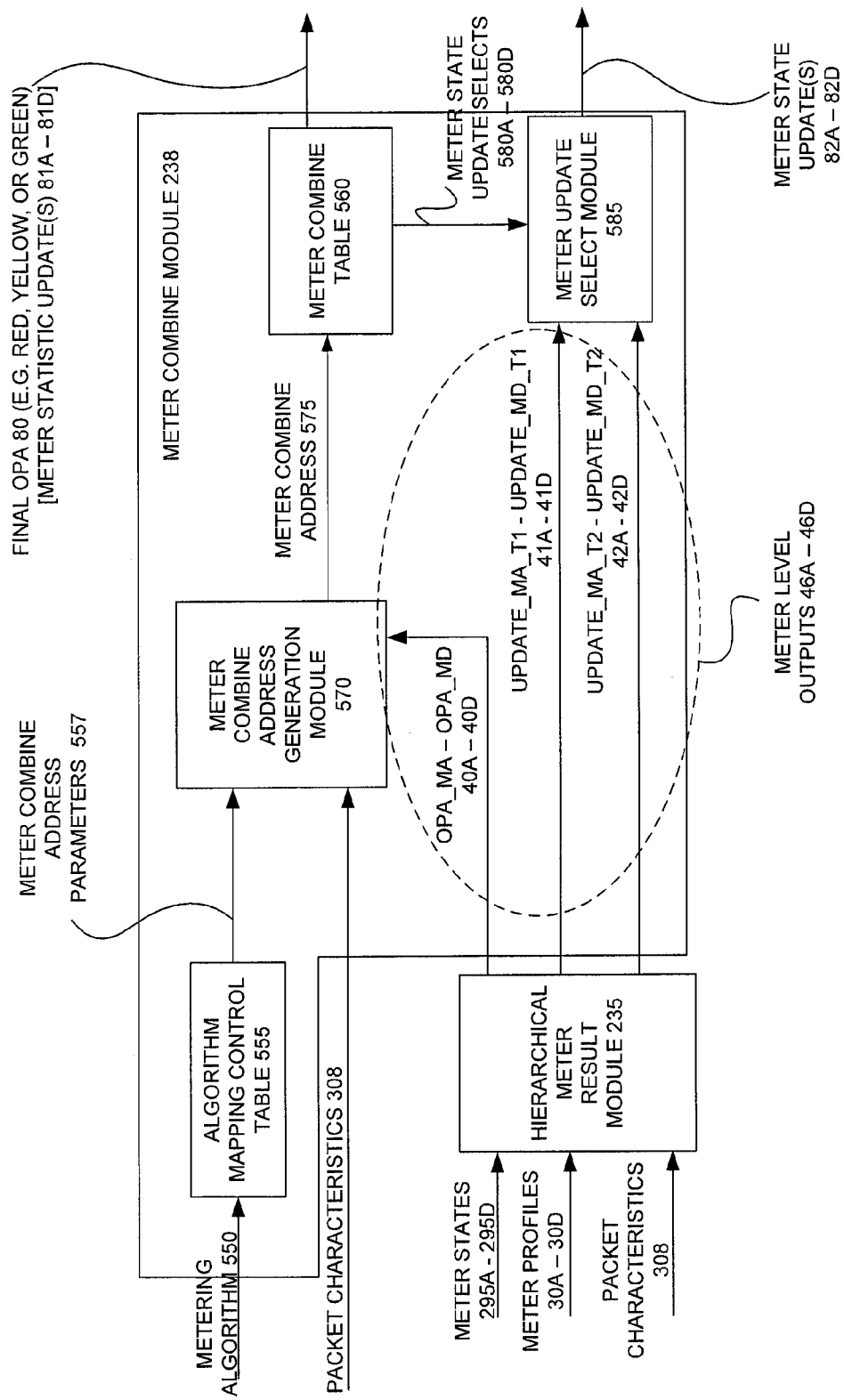
FIG. 5 is a block diagram illustrating a meter combine module including an algorithm mapping control table, a meter combine address generation module, and a meter combine table according to embodiments of the invention.

FIG. 5 is a block diagram illustrating a meter combine module (MCM) 238 including an algorithm mapping control table 555, a meter combine address generation module 570, and a meter combine table 560 according to embodiments of the invention. The meter level outputs 46A-46D and a metering algorithm 550 are communicated to the MCM 238. The metering algorithm 550 is identified by the request configuration information contained within the policer request 205. The metering algorithm 550 is used to determine how the meter level outputs 46A-46D should be combined to generate a final OPA 80 and the meter state updates 82A-82D. In one embodiment, the MCM 238 further utilizes the metering algorithm 550 to determine meter statistic updates 81A-82A.

The MCM 238 uses the metering algorithm 550 to retrieve a plurality of meter combine address parameters 557 from an algorithm mapping control table 555. In one embodiment, the meter combine address parameters 557 include force IPA/OPA bits 557A parameters, IPA/OPA mask 557B parameters, and a base address 557C. In other embodiments the meter combine address parameters 557 include more or less information, for example it includes a function select 557D parameter. A meter combine address generation module 570 uses the meter combine address parameters 557, the packet characteristics 308, and the meter level OPAs 40A-40D to generate a meter combine address 575.

Figure 6:
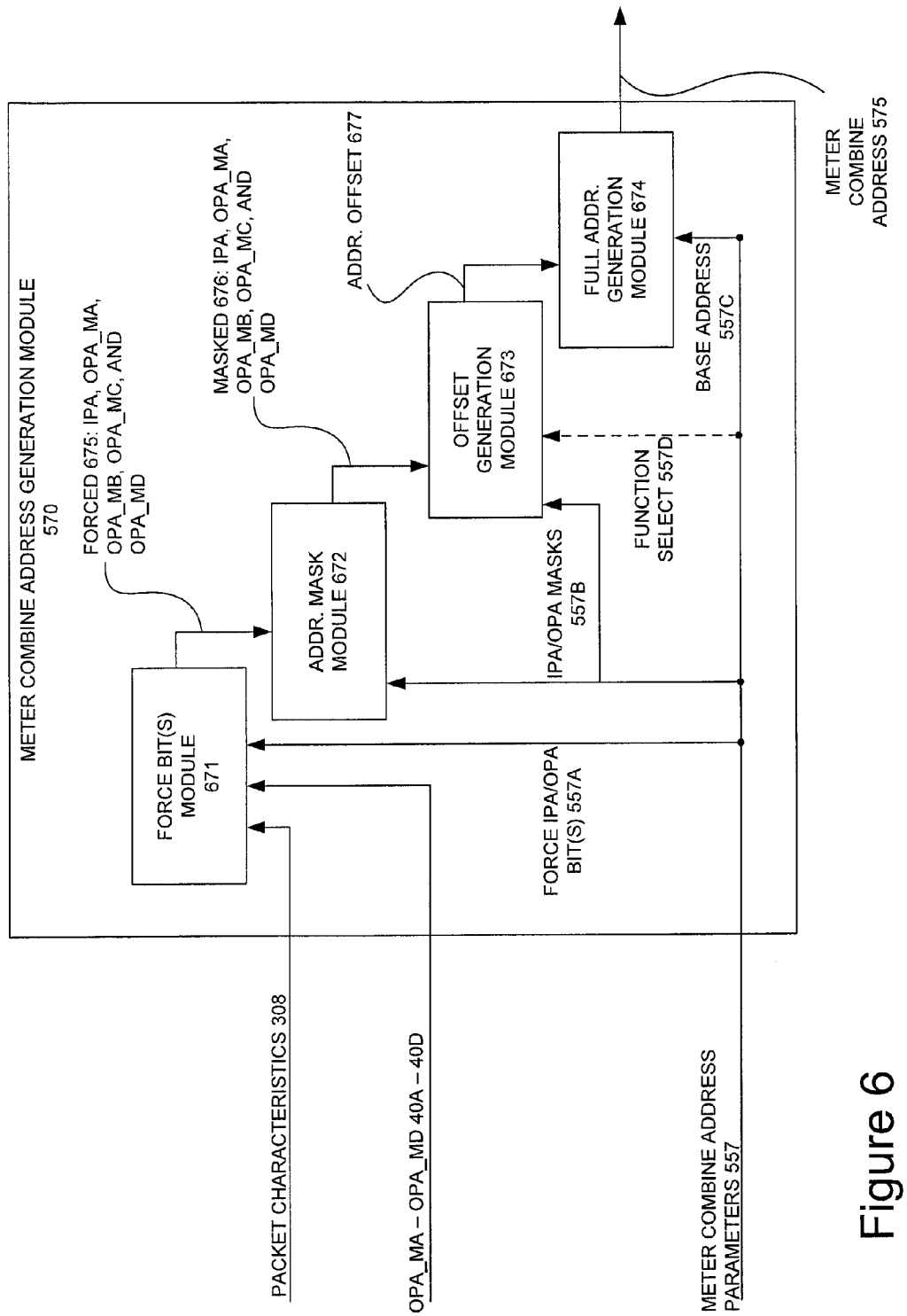
FIG. 6 is a block diagram illustrating a meter combine address generation module of the meter combine module according to embodiments of the invention.

FIG. 6 is a block diagram illustrating a meter combine address generation module 570 of the MCM 238 according to embodiments of the invention. The meter combine address generation module 570 has a force bits module 671 that generates forced IPA/OPAs 675. Furthermore the meter combine address generation module 570 has an address mask module 672 and offset generation module 673 that generate masked IPA/OPAs 676 and an address offset 677 correspondingly. Finally, the meter combine address generation module 570 has a full address generation module that utilizes the base address 557C and the address offset 677 to generate a meter combine address 575.

The force bits module 671 uses the IPA from the packet characteristics 308 and the meter level OPAs 40A-40D along with the force IPA/OPA parameters 557A. The force IPA/OPA parameters 557A includes a plurality of fields that each correspond to either the IPA or one of the meter level OPAs 40A-40D and each field has the same number of bits as its corresponding IPA/OPA. With reference to the three bit examples of the IPA and the meter level OPAs from FIGS. 3A and 3B, the fields in the force IPA/OPA parameters 557A are three bits. In one embodiment, each bit in the fields that is set to a 1 corresponds to a bit in the IPA or meter level OPAs 40A-40D that should be forced to a 0. By way of example, if the IPA is GREEN '111' and the force IPA parameter is '010' then the forced IPA would be '101'. In another embodiment, each bit in the fields that is set to a 1 corresponds to a bit in the IPA or meter level OPAs 40A-40D that should be forced to a 1. In another embodiment two force parameters are included for each of the IPA and OPAs, one parameter to indicate bits to be forced to 0 and the other parameter to indicate bits to be forced to 1. In embodiments that use two parameters for each of the IPA and OPAs, one of the two parameters would take precedent such that in one case if both the force to 0 and the force to 1 bits were set then the force to 1 would take precedent while in another case if both the force to 0 and the force to 1 bits were set the force to 0 would take precedent. The forced IPA/OPAs 676 are then output to the address mask module 672.

The address mask module 672 utilizes the forced IPA/OPAs 675 combined with a plurality of IPA/OPA mask parameters 557B. Similar to the forced IPA/OPA parameters 557A, there is a mask parameter corresponding to each of the IPA and OPAs that is the same size as the corresponding IPA and OPAs. The forced IPA/OPAs 675 are logically ANDed with their corresponding IPA/OPA mask parameter 557B. Using the example from the force bit module 671 description, if the forced IPA is '101' and the IPA mask parameter is '110' then the masked IPA is '100'. The masked IPA/OPAs 676 are then output to offset generation module 673.

The offset generation module 673 utilizes the masked IPA/OPAs 676 along with the IPA/OPA mask parameters 557B to generate the address offset. In one embodiment the offset generation module 673 concatenates the masked IPA/OPAs 676 into an address offset. The masked IPA corresponds to the low order bits of the address offset while meter level A's masked OPA corresponds to the next lowest order bits. Each of the subsequent meter level's masked OPA corresponds to the next lowest order of the remaining bits such that meter level D's masked OPA corresponds to the highest order bits of the address offset. In one embodiment, the address offset has fewer bits then all of the bits in the IPA and OPAs so that during concatenation only bits with a corresponding mask bit set to 1 are included the address offset and bits with a 0 in its corresponding mask are skipped. Thus, the number of mask IPA/OPA parameter bits set to 1 may be less than or equal to the size of the address offset. In another embodiment, the offset generation module 673 receives another parameter, a function select parameter 557D that indicates one of a plurality of functions to be performed to generate the address offset. In one embodiment, the function select parameter 557D specifies one of the following functions: select the minimum of the masked IPA/OPAs 676, select the maximum of the masked IPA/OPAs 676, or concatenate the masked IPA/OPAs 676. Other embodiments may include more or less functions among the selection such as: logically AND the masked IPA/OPAs 676, logically OR the masked IPA/OPAs 676, and perform no operation (just output a preconfigured address offset). The offset generation module 673 then outputs the address offset 677 to the full address generation module 674.

The full address generation module utilizes the base address parameter 557C and the address offset 677 to generate the meter combine address 575. The base address parameter 557C and the address offset 677 are logically ORed together to come up with the meter combine address 575. Referring back to FIG. 5, the meter combine address generation module 570 then outputs the meter combine address 575 to the meter combine table 560.

The MCM 238 then uses the meter combine address 575 to retrieve a corresponding set of meter state update selects 580A-580D and a final OPA 80 from the meter combine table 560. In one embodiment, the MCM 238 also retrieves the set of meter statistic updates 81A-81D from the meter combine table 560.

The MCM 238 then uses the meter state update selects 580A-580D and the sets of one or more meter token state update indicators 41A-41D and 42A-42D to generate a plurality of meter state updates 82A-82D. By way of example, the meter state update selects 580A-580D indicate that meter level B updates should occur but that meter level A, C, and D updates should not occur (e.g. by setting meter state update select 580B to true and 580A, 580C, and 580D to false). In this example, the meter state update indicators 41B and 42B are used to generate a meter state update 82B while 82A, 82C, and 82D indicate no other updates should be performed. In this way, the meter state that was used by the meter 320B in level B of the HMRM will be updated by the policer control module 220 while the other meter states used by the remaining meters will not be updated regardless of the state of their corresponding meter state update indicates 41/42A, 41/42C, and 41/42D.

Figure 7:
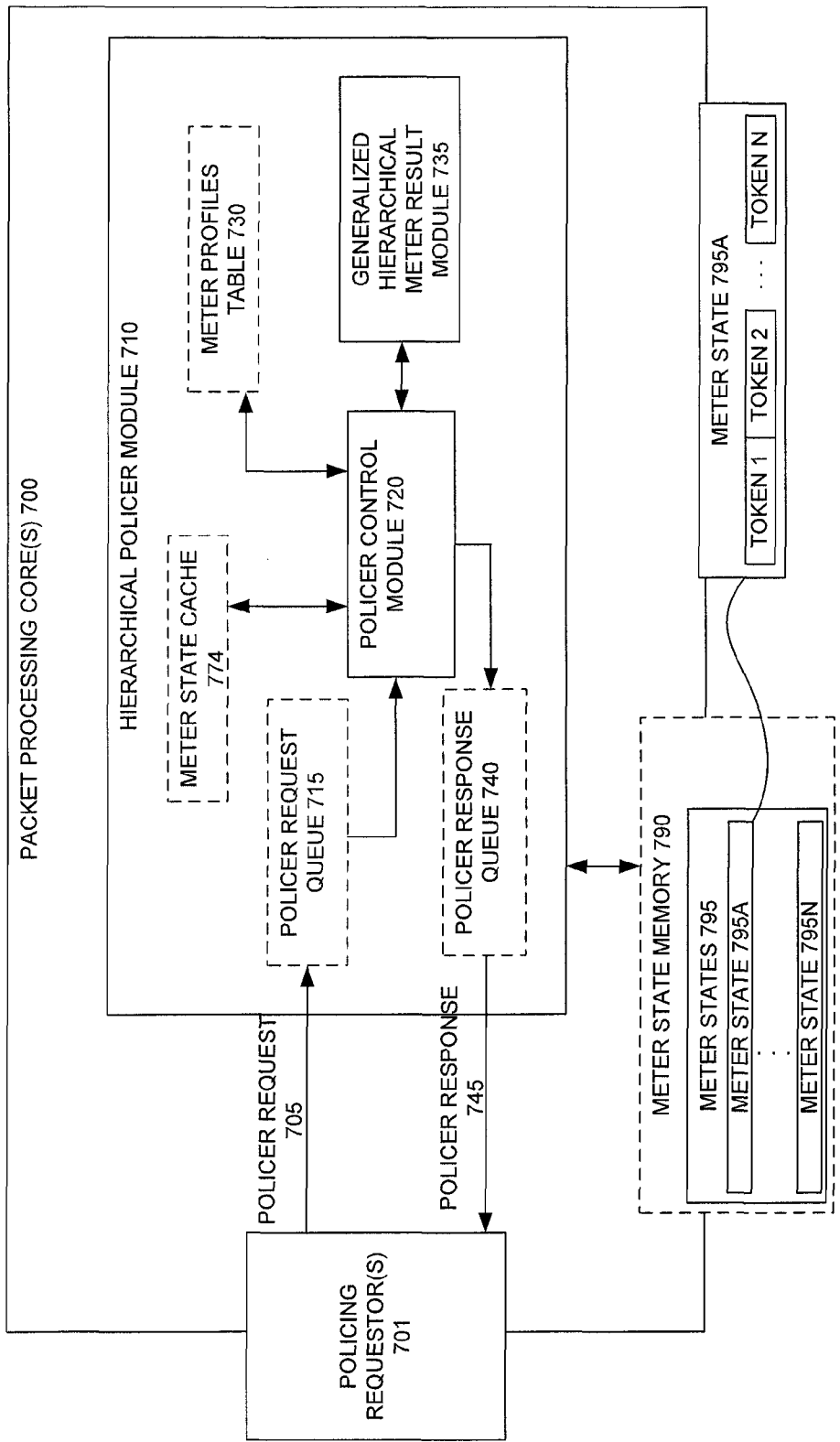
FIG. 7 is a block diagram illustrating a system including at least one policing requestor and at least one packet processing core that includes a generalized hierarchical policer module in which packets are processed through a hierarchy of meter levels according to embodiments of the invention.

FIG. 7 is a block diagram illustrating a system including at least one policing requestor and at least one packet processing core that includes a generalized hierarchical policer module in which packets are processed through a hierarchy of meter levels according to embodiments of the invention. FIG. 7 is similar to FIG. 2 with elements that perform similar functionality to their counterparts from FIG. 2 except that 1) HMRM 235 has been replaced with a generalized HRMR 735, and 2) the meter combine module 238 has been incorporated into the generalized HRMR 735. In FIG. 7, the generalized HMRM 735 generates a final OPA, one or more meter state update indicators, and, optionally, one or more meter statistic update indicators.

Figure 8:
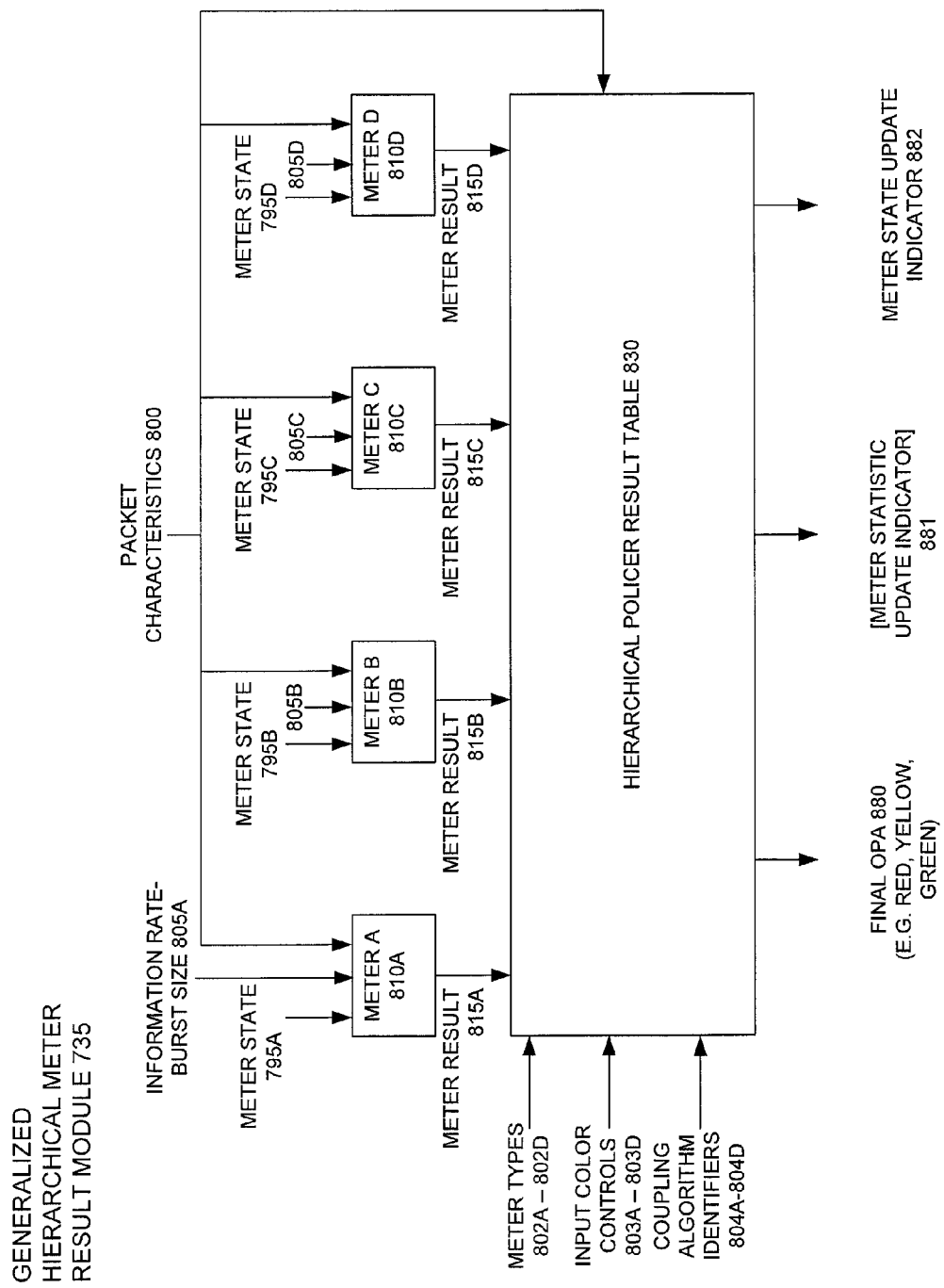
FIG. 8 is a block diagram illustrating a generalized hierarchical meter result module to be configured according to a packet policing request according to embodiments of the invention.

FIG. 8 is a block diagram illustrating a generalized hierarchical meter result module to be configured according to a packet policing request according to embodiments of the invention. FIG. 8 shows packet characteristics 800 and information rate-burst size 805A-805D being input into four meters 810A-810D along with the previously retrieved meter state 795A-795D for each corresponding meter 810A-810D. The meters 810A-810D operate in the manner described with reference to FIG. 4 and generate meter results 815A-815D. Each meter result 815A-815D indicates a pass or fail for each bucket being tested for that meter as described above. The meter results 815A-815D are input into a generalized meter OPA couple module 830 along with a set of meter OPA coupling configuration settings comprising meter types 802A-802D, input color controls 803A-803D, and a set of one or more coupling algorithm identifiers 804A-804D. The set of meter OPA coupling configuration settings are determined by policer request 705 received from the policing requestor 701. In one embodiment, the policing requestor 701 identifies one or more meter profiles to be retrieved from the meter profiles table 730 which includes information to generate the set of meter OPA coupling configuration settings. In one embodiment, the hierarchical policer result table 830 performs a series of shifted ORs on the meter results 815A-815D, the set of meter OPA coupling configuration settings, and one or more of the packet characteristics 800 to generate a hierarchical policer table lookup address and then performs a hierarchical policer table lookup with the hierarchical policer table lookup address to retrieve the corresponding final OPA 880, meter statistic update indicator 881 (which is optional), and meter state update indicator 882. In another embodiment, the generalized meter OPA coupling module 830 performs a series of table lookups with addresses generated for each set of inputs (e.g., meter result 815A, meter type 802A, input color control 803A) and combines the intermediary lookups with the meter coupling algorithm identifier 804 to generate the final OPA 880, meter statistic update indicator 881 (which is optional), and meter state update indicator 882.

The generalized HMRM of FIG. 8 has the advantage of being extremely flexible and requires very little processing power to perform at very high packet policing rates. Furthermore, the flexibility of the generalized HMRM 735 is only limited by the number of output options the hierarchical policer result table 830 can hold and the hierarchical policer result table 830 can be updated with modified and/or new packet policing configurations with the mere change to the entries of the lookup table. This allows for the hierarchical policer module to change its policing algorithm without changes to the policing hardware and without affecting the rate at which the policer operates.

Figure 9:
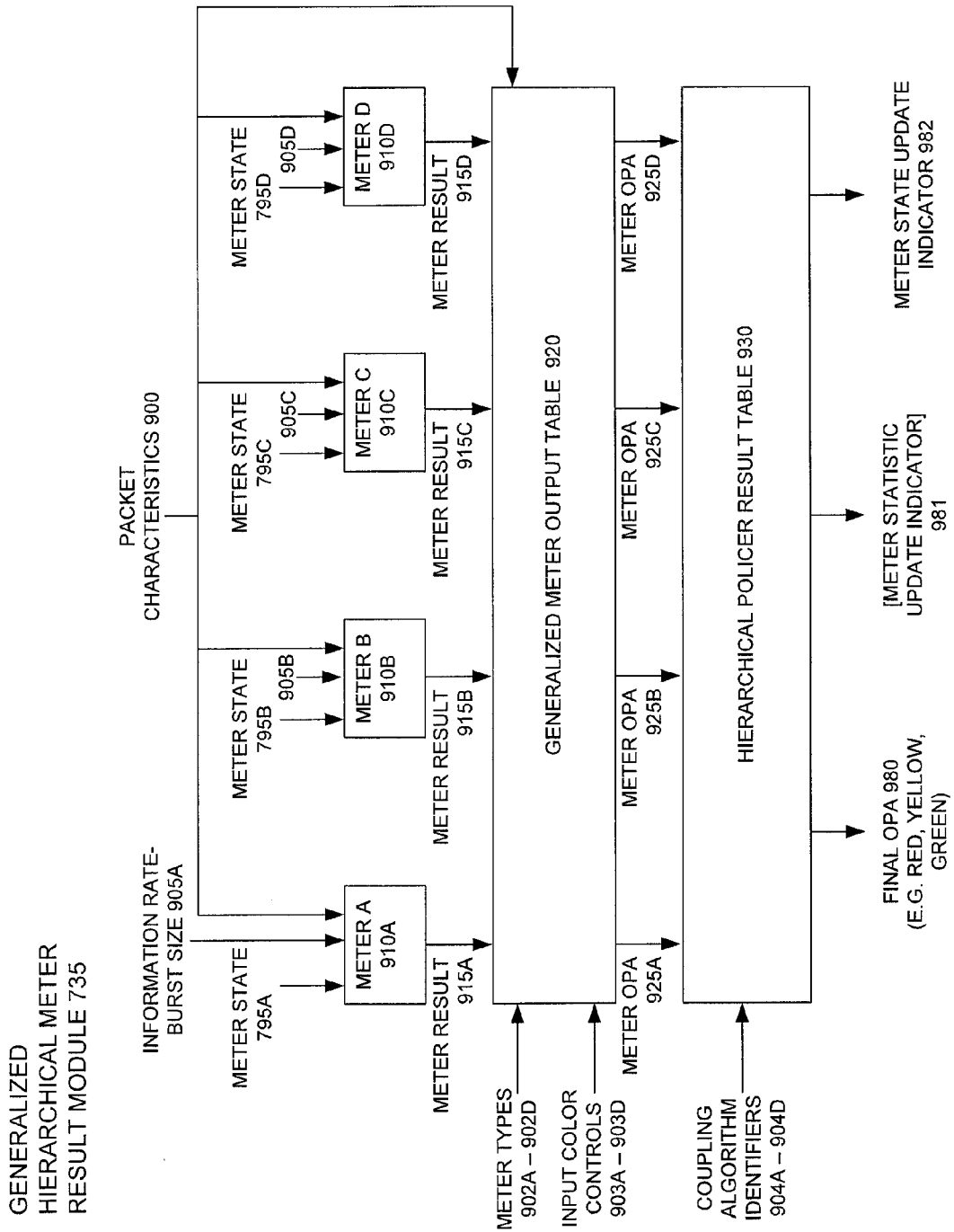
FIG. 9 is a block diagram illustrating another generalized hierarchical meter result module with a generalized meter output module and generalized meter output packet attribute couple module, the hierarchical meter result module to be configured according to a packet policing request according to embodiments of the invention.

FIG. 9 is a block diagram illustrating another generalized hierarchical meter result module with a generalized meter output module and generalized meter output packet attribute couple module, the hierarchical meter result module to be configured according to a packet policing request according to embodiments of the invention. FIG. 9 shows packet characteristics 900 and information rate-burst size 905A-905D being input into four meters 910A-910D along with the previously retrieved meter state 795A-795D for each corresponding meter 910A-910D. The meters 910A-910D operate in the manner described with reference to FIG. 4 and generate meter results 915A-915D. Each meter result 915A-915D indicates a pass or fail for each bucket being tested for that meter as described above.

The meter results 915A-915D are input into a generalized meter output module 920 along with meter types 902A-902D and input color controls 903A-903D to generate meter OPA 925A-925D. In one embodiment, the generalized meter output table 920 performs a series of shifted ORs on the meter results 815A-815D, meter types 902A-902D, one or more of the packet characteristics 900, and the input color controls 903A-903D to generate a meter output table lookup address and then performs a table lookup with the meter output table lookup address to retrieve the corresponding meter OPAs 925A-925D. In another embodiment, the generalized meter output module 920 performs a series of table lookups with addresses generated for each set of inputs (e.g., meter result 915A, meter type 902A, input color control 903A) to generate a corresponding meter OPA (e.g., meter OPA 925A).

The meter OPAs 925A-925D are combined with one or more coupling algorithm identifiers 904A-904D in the hierarchical policer result table 930 to generate a final table lookup address that is used to lookup the corresponding final OPA 980, meter statistic update indicator 981 (which is optional), and meter state update indicator 982.

As with the generalized HMRM of FIG. 8, the generalized HMRM of FIG. 9 has the advantages of being extremely flexible and requiring very little processing power to perform at very high packet policing rates. Furthermore, the flexibility of the generalized HMRM is only limited by the number of output options the generalized meter output module 920 can hold and the number of output option the hierarchical policer result table 930 can hold. The separation of the generalized meter output table 920 and the hierarchical policer result table 930 allow for the design of smaller lookup tables in each module 920 and 930.

Figure 10:
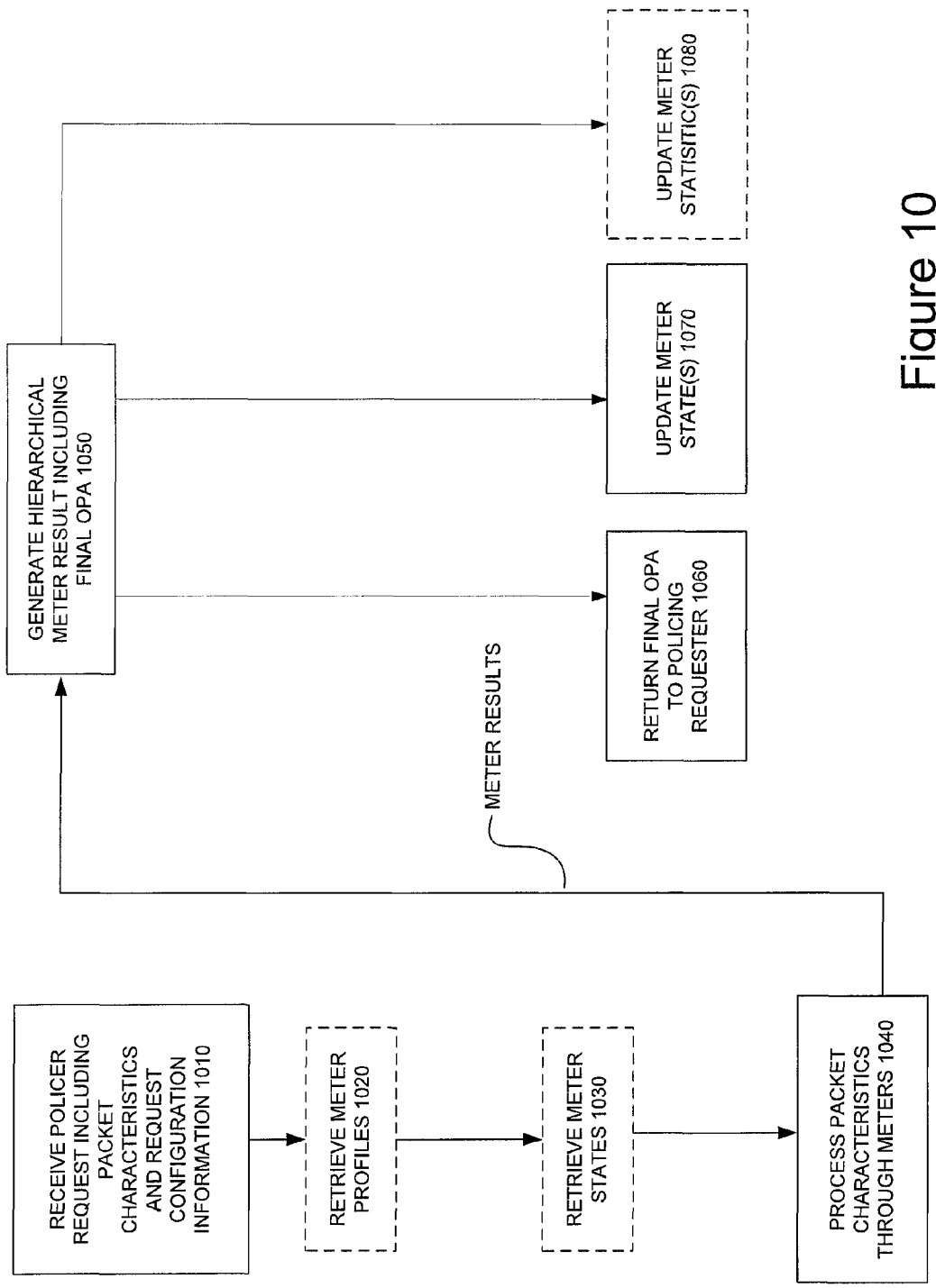
FIG. 10 is a flow chart illustrating a method for performing generalized hierarchical packet policing according to embodiments of the invention.

FIG. 10 is a flow chart illustrating a method for performing generalized hierarchical packet policing according to embodiments of the invention. This figure includes steps that are optional depending on the specific implementation and such steps are shown with dashed boxes. A policer request is received (Block 1010) including packet characteristics and request configuration information. In one embodiment, a plurality of meter profiles identified by the request configuration information are retrieved (Block 1020) from a meter profile table. In a further embodiment, a plurality of meter states are retrieved (Block 1030) from either a meter state memory or meter state cache. The optional steps (Block 1020 and Block 1030) may be utilized together in embodiments of the invention.

The packet characteristics are processed (Block 1040) through a plurality of meters, each meter corresponding to a meter level, to produce a plurality of meter results. As evident in discussion of embodiments of the invention, the properties of each meter level A-D are defined by the corresponding meter profiles and coincide with a meter state designated for each particular level.

The meter results are used to hierarchically generate a hierarchical meter result (Block 1050) including a final OPA. The final OPA is returned to the policing requester (Block 1060) and updates one or more meter states (Block 1070) according to the policer request and the meter results. Optionally, the generation of hierarchical meter results include meter statistics updates used to update meter statistics (Block 1080).

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a packet processor core for policing a packet through a runtime configurable hierarchical policer at line rate, the hierarchical policer coupled to one or more policing requestors, the method comprising the steps of:
   receiving, from one of the policing requestors, a policer request to perform hierarchical packet policing, wherein the policer request comprises packet characteristics and identifies request configuration information;
   retrieving a plurality of meter states from meter state storage, each meter state specified by the request configuration information for one of the plurality of meters, wherein the retrieving comprising the steps of:
      checking a meter state cache for the presence of each meter state;
      retrieving, from the meter cache, each meter state found in the meter cache;
      retrieving, from a meter state memory, each meter state not found in the meter cache; and
      loading, into the meter state cache, each meter state retrieved from the meter state memory;
   processing one or more of the packet characteristics through each meter to generate a meter result indicating how one or more of the packet characteristics compare to that meter's specified meter state;
   generating a hierarchical policer table lookup address using a plurality of meter types, a plurality of input color controls, one or more of the packet characteristics, the plurality of meter results, and the plurality of coupling algorithm identifiers;
   reading a hierarchical meter result from a hierarchical policer result table, wherein the hierarchical meter result contains at least a final output packet attribute that classifies the packet, and wherein the hierarchical meter result further comprises a meter state update indicator that indicates one or more meter states to be updated and the meter states are updated in the meter state cache;
   updating one or more of the meter states based, in part, on the plurality of meter state results; and
   returning the final packet output to the policing requestor.

2. The method of claim 1, wherein the hierarchical meter result further comprises a meter statistic update indicator that indicates one or more meter statistics to be updated.

3. The method of claim 1 wherein the step of creating a meter result comprising comparing at least one token to a token check value.

4. The method of claim 3, wherein the packet characteristics comprise a packet size and wherein the token check value corresponds to the packet size.

5. The method of claim 1, wherein the request configuration information identifies a plurality meter profiles, each meter profile corresponding to one of the plurality of meters and the method further comprising the step of reading the plurality of identified meter profiles from a meter profile tables, each meter profile identifying a corresponding meter state, an information rate, a burst size, a meter type, an input color control, and a coupling algorithm identifier.

6. The method of claim 5, wherein the packet characteristics include an input packet attribute that indicates a packet classification and wherein the step of generating a hierarchical policer table lookup address comprises:
   generating a generalized meter output table lookup address by combing the plurality of meter types, the plurality of input color controls, the input packet attribute, and the plurality of meter results;
   reading a plurality of meter output packet attributes from a generalized meter output table using the generalized meter output table lookup address; and
   combining the plurality of coupling algorithm identifiers and the plurality meter output packet attributes.

7. A hierarchical policer module, coupled to one or more policing requestors, to police a packet through a runtime configurable hierarchical policer at line rate, the hierarchical policer module comprising:
   a policer control module configured to:
      receive policer requests that originate from policing requestors, each policer request to include packet characteristics and to include request configuration information, the request configuration information to identify a meter state, an information rate, a burst size, a meter type, an input color control, and a coupling algorithm identifier for each of a plurality of meters,
      retrieve the plurality of specified meter states from meter storage, each meter state to be comprised of meter tokens that each indicates an amount of available resources for that meter state,
      transmit one or more of the packet characteristics, the plurality of identified meter states, the plurality of information rates, the plurality of burst sizes, the plurality of identified meter types, the plurality of identified input color controls, and the plurality of coupling algorithm identifiers to a hierarchical meter result module, receive a hierarchical meter result from the hierarchical meter result module, the hierarchical meter result to include a final output packet attribute to classify the packet, and transmit a policer response to the policing requestor, the policer response to indicate, at least, the final packet output attribute;

a meter state cache configured to cache a one or more meter states and wherein the hierarchical policer module is further coupled to meter state memory to store meter states, the hierarchical policer module further configured to:

check the meter state cache for the presence of each of the plurality of identified meter states;

retrieve, from the meter cache, each identified meter state found in the meter cache;

retrieve, from meter state memory, each identified meter state not found in the meter cache; and load, into the meter state cache, each identified meter state retrieved from meter state memory;

the hierarchical meter result module, coupled to the policer control module, to be configured to:

generate a meter result at one or more meters to indicate how one or more of the packet characteristics compares with that meter's identified meter state, wherein the meter result further comprises a meter state update indicator to indicate one or more meter states to be updated and the meter states are to be updated in the meter state cache, generate a hierarchical policer table lookup address with a plurality of meter types, a plurality of input color controls, one or more of the packet characteristics, the plurality of meter results, and the plurality of coupling algorithm identifiers, read the hierarchical meter result from a hierarchical policer result table, and transmit the hierarchical meter result to the policer control module.

8. The hierarchical policer module of claim 7, wherein the hierarchical meter result is to further include a meter statistic update indicator to indicate one or more meter statistics to be updated.

9. The hierarchical policer module of claim 7, wherein each meter result is to be generated by comparing at least one token to a token check value.

10. The hierarchical policer module of claim 9, wherein the packet characteristics are to comprise a packet size and wherein the token check value is to correspond to the packet size.

11. The hierarchical policer module of claim 7, wherein the packet characteristics are to include an input packet attribute to indicate a packet classification and wherein the hierarchical meter result module is further configured to:

generate a generalized meter output table lookup address with the plurality of meter types, the plurality of input color controls, the input packet attribute, and the plurality of meter results;

read a plurality of meter output packet attributes from a generalized meter output table with the generalized meter output table lookup address; and combine the plurality of coupling algorithm identifiers and the plurality meter output packet attributes.

* * * * *

UNITED STATES PATENT AND TRADEMARK OFFICE
CERTIFICATE OF CORRECTION

| | | |
|---|---|---|
| PATENT NO. | : 8,767,540 B2 | Page 1 of 1 |
| APPLICATION NO. | : 13/239214 | |
| DATED | : July 1, 2014 | |
| INVENTOR(S) | : Alleyne et al. | |

It is certified that error appears in the above-identified patent and that said Letters Patent is hereby corrected as shown below:

In the Specification

In Column 6, Line 15, delete "policer requestor" and insert -- policing requestor --, therefor.

In Column 6, Line 32, delete "policer requestors" and insert -- policing requestors --, therefor.

In Column 8, Lines 16-17, delete "295A-295D and packet characteristics 308." and insert
-- 295A-295D, packet characteristics 308, and a plurality of information rate-burst size combinations 311A-311D. --, therefor.

In Column 9, Line 17, delete "meter result 46A-46D" and insert -- meter result 45A-45D --, therefor.

In Column 9, Line 18, delete "meter level output 45A-45D" and insert -- meter level output 46A-46D --, therefor.

In Column 9, Line 31, delete "5)" and insert -- 5). --, therefor.

In Column 14, Line 33, delete "HRMR" and insert -- HMRM --, therefor.

In Column 14, Line 35, delete "HRMR" and insert -- HMRM --, therefor.

Signed and Sealed this
Eleventh Day of November, 2014

Michelle K. Lee
*Deputy Director of the United States Patent and Trademark Office*